(12) United States Patent
Heimann et al.

(10) Patent No.: US 9,205,472 B2
(45) Date of Patent: Dec. 8, 2015

(54) MACHINE FOR DEEP-ROLLING AXLES

(75) Inventors: Alfred Heimann, Aachen (DE); Roland Heffe, Korschenbroich (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 258 days.

(21) Appl. No.: 13/807,067

(22) PCT Filed: Jul. 1, 2010

(86) PCT No.: PCT/DE2010/000771
§ 371 (c)(1),
(2), (4) Date: Mar. 18, 2013

(87) PCT Pub. No.: WO2012/000463
PCT Pub. Date: Jan. 5, 2012

(65) Prior Publication Data
US 2013/0167609 A1 Jul. 4, 2013

(51) Int. Cl.
*B21B 13/00* (2006.01)
*B21H 1/18* (2006.01)
*B21H 7/06* (2006.01)
*B23P 9/02* (2006.01)
*B24B 39/04* (2006.01)

(52) U.S. Cl.
CPC *B21B 13/00* (2013.01); *B21H 1/18* (2013.01); *B21H 7/06* (2013.01); *B23P 9/02* (2013.01); *B24B 39/045* (2013.01)

(58) Field of Classification Search
CPC .......... B21B 13/00; B21H 1/18; B21H 7/185; B21H 7/182; B21H 8/02; B21H 8/00; B21H 7/187; B24B 39/045; B24B 39/004; B24B 39/04; B24B 5/42; B24B 5/423; B24B 17/025; B21D 3/02; B21D 53/84; B21D 53/845; B21D 3/16; B21D 17/04; B21D 22/14; B21D 22/16; B21D 22/18; B21D 31/005; B23P 9/02; B23P 2700/02; B23P 2700/07

USPC ......... 72/31.03, 31.07, 81, 118, 226, 174, 84, 72/86, 87, 107, 110, 31.08, 31.09, 85, 98, 72/100–101, 121, 125; 29/6.01, 888.08
See application file for complete search history.

(56) References Cited

U.S. PATENT DOCUMENTS

| | | | |
|---|---|---|---|
| 3,165,814 A | 1/1965 | Miller et al. | |
| 4,238,944 A * | 12/1980 | Duffy | 72/84 |
| 7,134,304 B2 * | 11/2006 | Nakayama et al. | 72/102 |
| 8,117,877 B2 * | 2/2012 | Massee | 72/84 |

FOREIGN PATENT DOCUMENTS

| | | |
|---|---|---|
| CH | 130 090 A | 11/1928 |
| DE | 808197 C | 7/1951 |
| DE | 843822 C | 7/1952 |

OTHER PUBLICATIONS

International Search Report and Written Opinion (both in German with English translation) for PCT/DE2010/000771, mailed Apr. 15, 2011; ISA/EP.

* cited by examiner

*Primary Examiner* — Peter DungBa Vo
*Assistant Examiner* — Joshua D Anderson
(74) *Attorney, Agent, or Firm* — Harness, Dickey & Pierce, P.L.C.

(57) ABSTRACT

The invention relates to a machine, in particular a machine tool (9) for deep rolling wheelset shafts (5) for rail vehicle wheelsets with a headstock (12) and a tailstock (13) which each have prick punch points (16) for holding a wheelset shaft (5) at its respective ends, a device (16, 18, 20, 21 and 22) for driving the wheelset shaft (5), as well as tools which can be moved in directions (z, x) on the machine tool (9) for deep rolling lengthwise sections (axle zones 1 to 4) of the wheelset shaft (5), and clamping and feed devices. The tools consist of several pairs of work rollers (14, 15, 23, 25, 24, 26), of which each pair is intended for deep rolling at least one axle zone (1, 2, 3, 4) of the wheelset shaft (5).

6 Claims, 9 Drawing Sheets

MACHINE FOR DEEP-ROLLING AXLES

CROSS REFERENCE TO RELATED APPLICATIONS

This application is a National State application of PCT international application PCT/DE2010/000771, filed on Jul. 1, 2010, The contents of the application is incorporated by reference in its entirety.

FIELD

The invention relates to a machine, in particular a machine tool, for deep rolling wheelset shafts for rail vehicle wheelsets with two prick punch points for holding a wheelset shaft at its respective ends, a device for driving the wheelset shaft, two pairs of crankshaft deep rolling tools, which can be moved in directions x, y and z of the machine tool for machining the axle journal for the wheelset shaft, and with clamping and feed devices for the crankshaft deep rolling tools.

BACKGROUND & SUMMARY

A "stamping wheel for burnishing shaft parts, particularly the axle journal and wheelset fail-safes" is known from the German patent document no. 808 197. The working surface of the stamping wheel consists of one cylinder, to which, on the one hand, a large rounding for the large corner groove of the axle journal and, on the other hand, a small rounding for the small corner groove on the axle collar are connected. The axle for the stamping wheel is supposed to adopt a skewed position to the axle of the axle journal during the burnishing procedure and, when pressed into the axle journal at one position, create a long, drop-shaped imprint on the surface of the axle journal.

At the time the above-mentioned German patent was registered, deep rolling was called "burnishing". A company brochure of the applicant from 1954 then shows a machine which can be used to deep roll the two axle journals on a wheelset from their respective outer ends. Only the axle journals of finished wheelsets were machined respectively. To do this, two pairs of work rollers were used which were each meshed simultaneously onto the axle journals for the wheelset. In those days, the wheelset was driven via a transmission belt, which was looped around one of the two wheel discs for the wheelset. With the known machine, the axle journals for the wheelset were rigidified to such an extent that, along with having an improved surface quality, they also had simultaneous higher strength, whereby hot axle boxes were able to be prevented on the one hand and axle journal breakage on the other. The known deep rolling operation therefore meant that internal stresses were introduced into the surface of the axle journal which led either to no cracks being produced or cracks that were already produced being able to be brought to a stop. The outcome was that an increase in the service life of the wheelset was achieved.

As well as the treatment of the axle journal, a "device for burnishing cylindrical workpieces like shaft parts" is already known from the German patent document no. 843 922. The known device features one or more work rollers, whereby each work roller is mounted in a pivoting carrier whose swivel axis runs both vertically to the infeed motion of the work roller and vertically, or nearly vertically, to the workpiece axis. The known device was supposed to be used mainly for machining cylindrical shafts, which does not rule out that it could be used for deep rolling wheelset shafts, too.

Damage to the wheelset shafts of railway high-speed vehicles which has recently occurred has led to particular attention being paid towards the finishing of the wheelset shafts. In doing so, the formation of cracks in particular is to be counteracted.

On the basis of the knowledge that by introducing residual compressive stresses into the surface of crankshafts, the formation of cracks can be prevented or cracks that have already occurred can be brought to a stop, the task of this invention is now to propose a modern machine which can be used to deep roll the wheelset shafts of wheelsets for railway vehicles before the wheel discs are fitted. As is well known, a wheelset shaft is characterised in that it features several adjacent lengthwise sections (hereinafter referred to as axle zones) with different diameters.

In a machine tool of the type specified, this invention means the task is solved by having tools that comprise more than two pairs of work rollers, of which each pair is intended for deep rolling at least one axle zone on the wheelset shaft. In a favoured variant, the tools comprise three pairs of work rollers.

Here, it is intended that the first pair of work rollers be used to deep roll the axle journals and transition piece, a second pair of work rollers to deep roll the press seating for one wheel disc and a third pair of work rollers to deep roll the stub shaft from the press seating at least up to the longitudinal centre of the wheelset shaft.

Ideally, the work rollers forming the first and second pair are each arranged together in one housing. This housing can be moved in the y-direction of the machine tool. Owing to the movability in the y-direction, the work rollers for the first and second pair of work rollers are meshed one after the other. At the same time, the housing can be pivoted around a B-axis of the machine tool. This movability makes it possible to machine the transitions between the individual axle zones of the wheelset shaft. As is well known, the transitions are arranged as corner grooves.

The first and the second pair of work rollers are at a specified fixed axial distance away from the third pair of work rollers in the z-direction of the machine tool. All three pairs of work rollers are ultimately arranged together on one slide. The common slide can be moved in the z-direction of the machine tool, i.e. in the feed direction. Two slides in total are provided on the machine tool, each of which is designated to the respective end of the wheelset shaft. When the axle zones are deep rolled, the two slides move towards each other at feed rate.

Ultimately, the crankshaft deep rolling tools can also be adjusted in the x-direction. A servo motor is used to feed in two work rollers, each forming one pair, in the direction of the wheelset shaft at the same time. Notably, all three pairs of work rollers are moved at the same time. The deep rolling force is also set via the infeed in the x-direction.

DRAWINGS

The drawings described herein are for illustrative purposes only of selected embodiments and not all possible implementations, and are not intended to limit the scope of the present disclosure.

The invention is described in detail below using a design example. The following views are illustrated at a reduced scale:

FIG. 2 the basic structure of a machine for deep rolling wheelset shafts in a perspective plan view, FIG. 3 the machining of the half of the wheelset shaft shown in FIG. 1 with the aid of crankshaft deep rolling tools, FIG. 4 the drive for a wheelset shaft in the sectional view, FIG. 5 the longitudinal section through a tool slide with three different work rollers, FIG. 6 a tool slide in a perspective view, FIG. 7 a section from the tool slide in FIG. 6 with a pair of work rollers, FIG. 8 the holder for an individual work roller, FIG. 9 the holder for two work rollers arranged vertically one above the other, FIG. 10 a first version of a layout with work rollers, FIG. 11 a second version of a layout with work rollers, and FIG. 12 a third version of a layout with work rollers.

DETAILED DESCRIPTION

Figure 1:
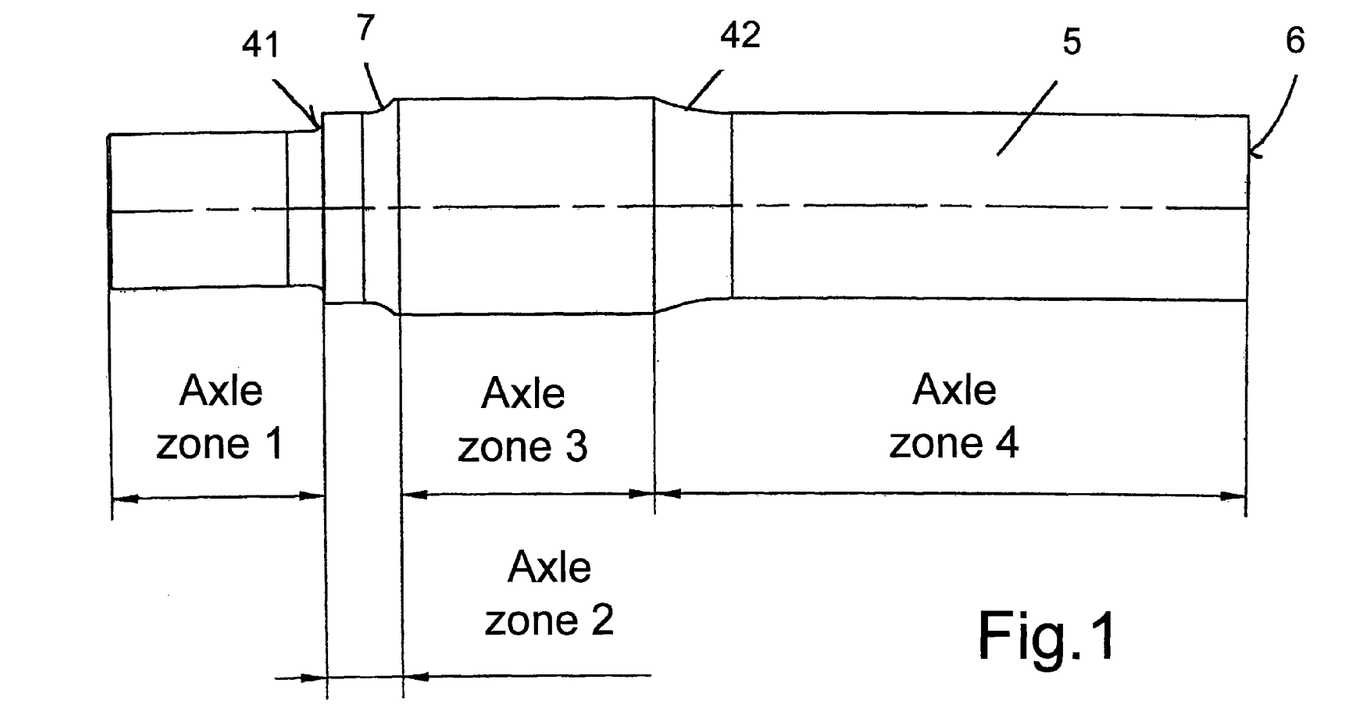
FIG. 1 one half of a wheelset shaft in the side view.

Wheelset shaft 5 on a wheelset (not shown) consists of several axle zones. Axle zone 1 represents the axle journal. Upon which the wheelset is rotatably mounted in the rail vehicle. In the direction towards the longitudinal centre 6 of the wheelset shaft 5, axle zone 2 follows axle zone 1. Axle zone 2 forms the transition between axle zone 2 and axle zone 3 and is formed through a corner groove 7. Axle zone 3 forms the press seating for a wheel disc (not shown) of the wheelset. Axle zone 3 is followed by axle zone 4, which is also referred to as the stub shaft, and has a considerably smaller diameter when compared with axle zone 3. Axle zone 4 stretches up to the longitudinal centre 6 of the wheelset shaft 5, upon which identical axle zones 4,3,2 and 1 follow to the other end (not shown) of the wheelset shaft 5.

Axle zones 1 to 4 for the half of the wheelset shaft 5 shown are machined by the first slide 8 for the machine tool 9, while the axle zones 4 to 1 on the other half (not shown) of the wheelset shaft 5 are worked on by a second slide 10 for the machine tool 9. At the same time, the two slides 8 and 10 work towards each other in the direction of the longitudinal centre 6 of the wheelset shaft 5, each starting from the axle zones 1.

Figure 2:
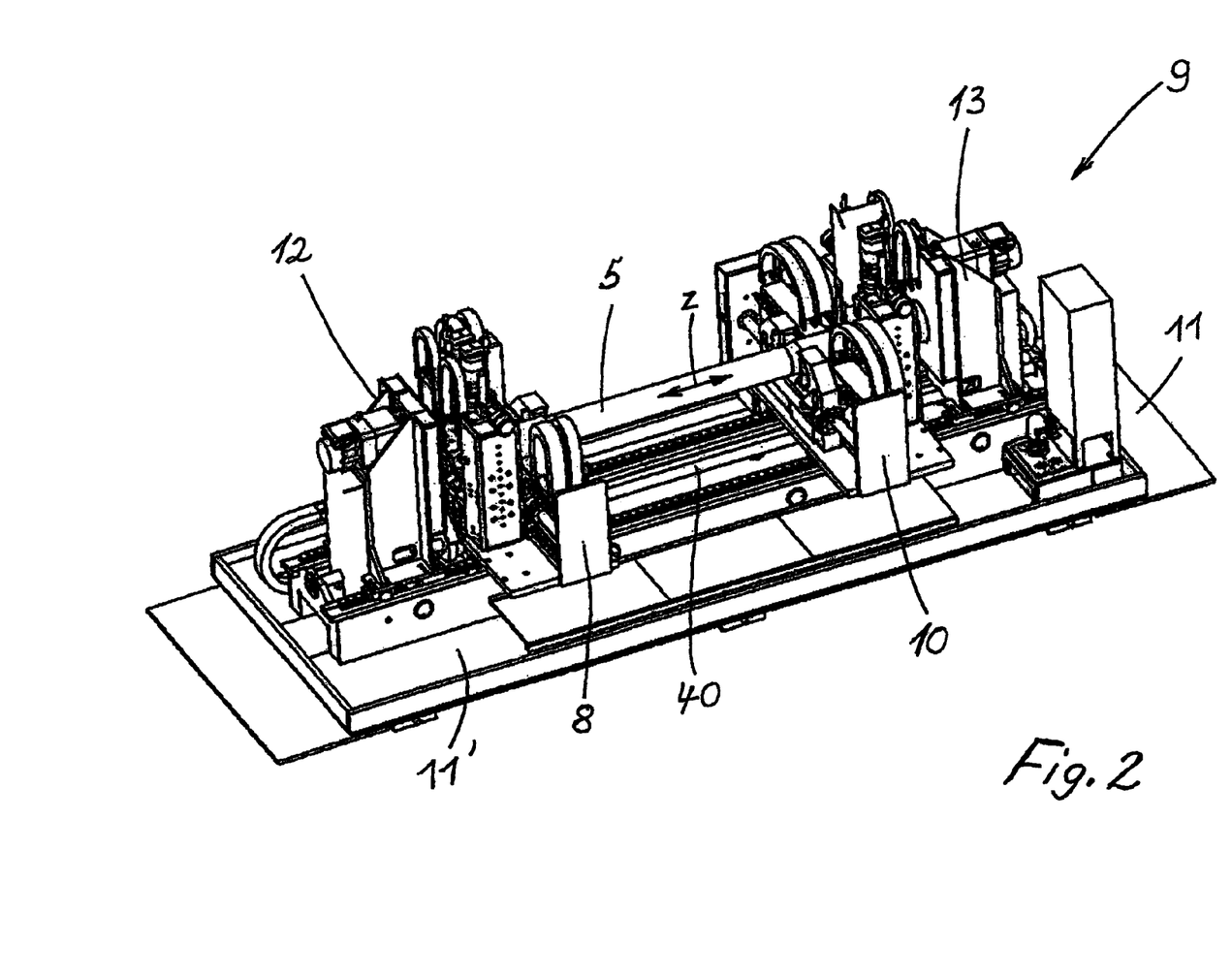

On machine bed 11 for machine tool 9, one headstock 12 and one tailstock 13 are initially arranged so that they can be moved longitudinally in the z-direction. The first slide 8 is upstream of the headstock 12 in the z-direction, and the second slide 10 is upstream of the tailstock 13 and can also be moved in the z-direction. The two slides 8 and 10 can be moved in the z-direction at feed rate, independent of their respective headstock 12 or tailstock 13. A second headstock, which is designed in exactly the same way as the headstock 12 shown, can also be provided in place of tailstock 13. The design of headstock 12 will be dealt with in the following.

Figure 3:
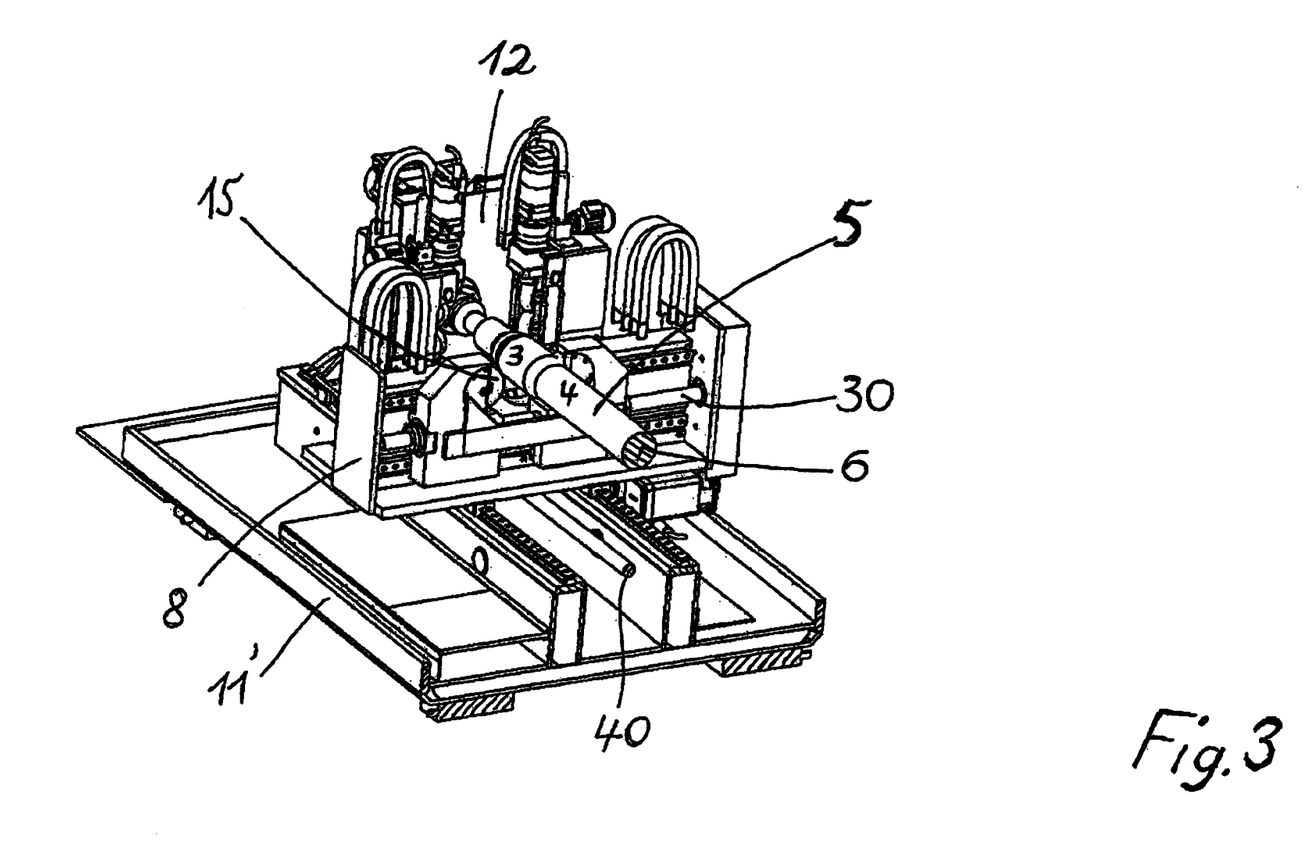
Figure 12:
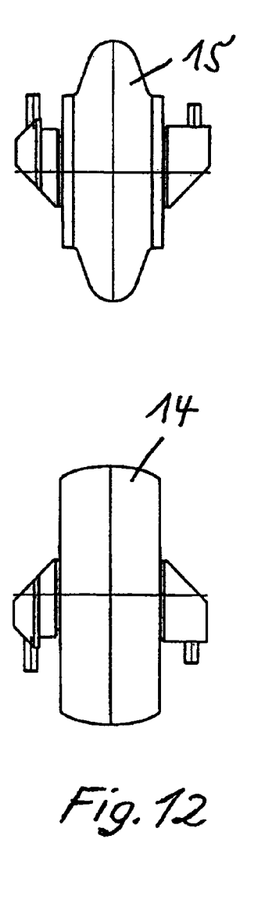

FIG. 3 shows the left half 11' of the machine bed 11. Clamped in headstock 12, one can see the left half of the wheelset shaft 5 shown in FIG. 1. One also recognises the first slide 8 with work rollers 14 and 15 (FIG. 12) for deep rolling axle zones 3 and 4.

Figure 4:
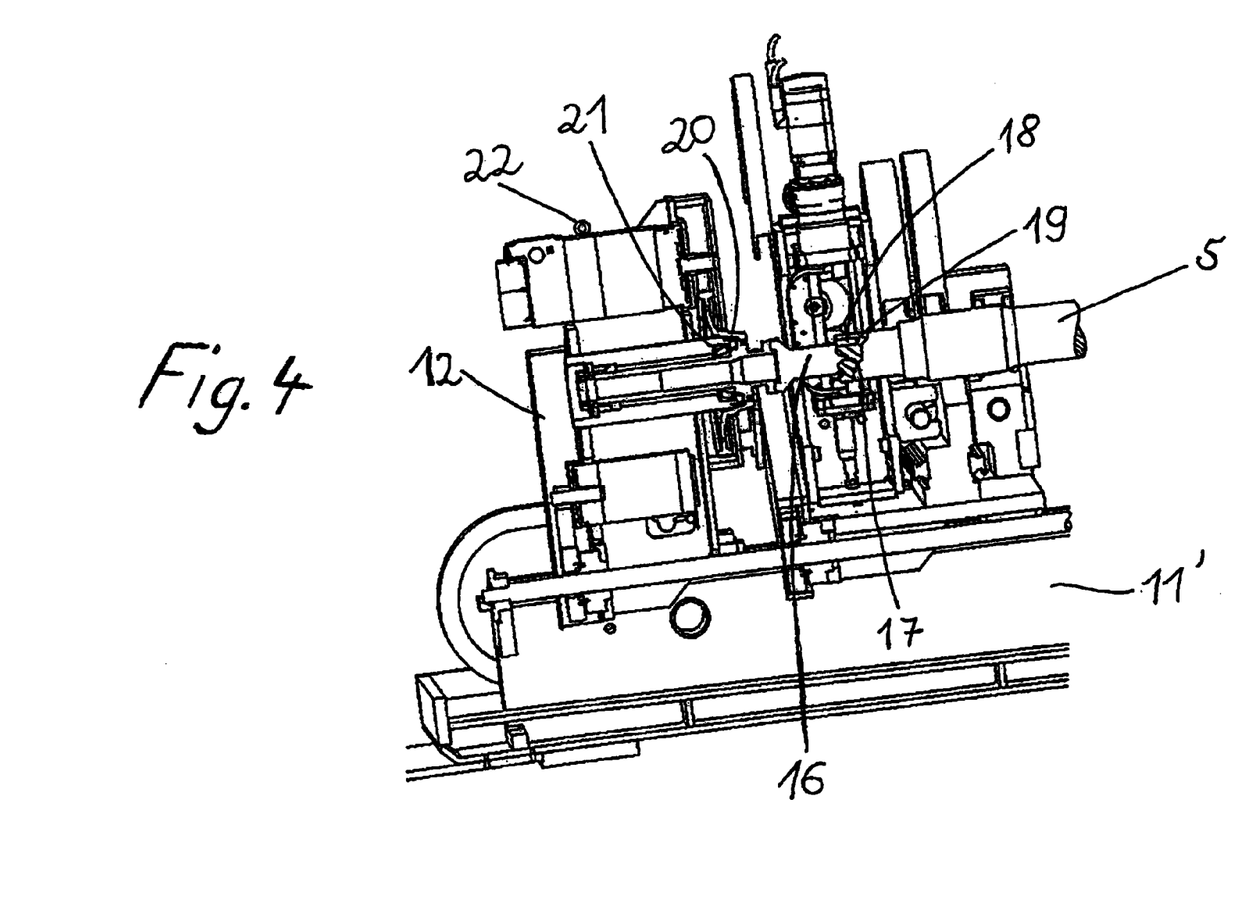

The headstock 12 shown in FIG. 4 initially has a headstock drive lug 16, which engages in the centring hole 17 of wheelset shaft 5. The headstock drive lug 16 has a driver pin 18 which it uses to engage in an axial bore 19 of wheelset shaft 5. Furthermore, the headstock drive lug 16 is fixed tightly to a pulley 20, which is rotatably mounted via supports 21 in tailstock 13. The pulley 20 is set in motion by a drive motor 22 via a belt drive (not shown) and moves the wheelset shaft 5 along with it via the headstock drive lug 16 and the driver pin 18 engaging in the wheelset shaft 5.

Figure 5:
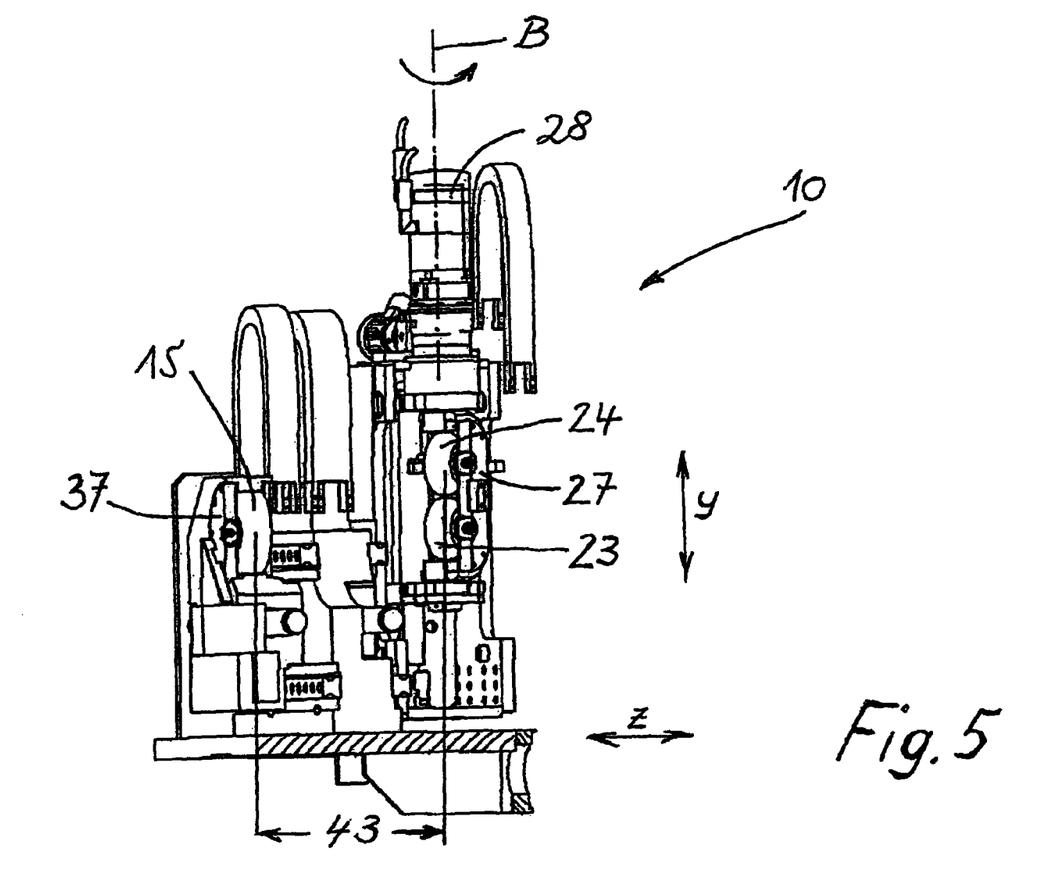

FIG. 5 shows a longitudinal section in the z-direction through the second slide 10. Here, one can see the two work rollers 23 and 24 arranged vertically one above the other, as well as work roller 15. The two work rollers 23 and 24 are both rotatably mounted together in one housing 27. Housing 27 can be moved in the vertical y-direction and the two work rollers 23 and 24 are at a fixed distance away from each other. Housing 27 can be moved up and down in the y-direction and can also be pivoted around a B-axis. A drive unit 28 is used for pivoting around the B-axis and for moving in the Y-direction. Together with its respective counter-rollers 25 or 26, the work rollers 23 and 24 are provided in order to deep roll the axle zones 1 and 2 on the wheelset shaft 5.

Figure 6:
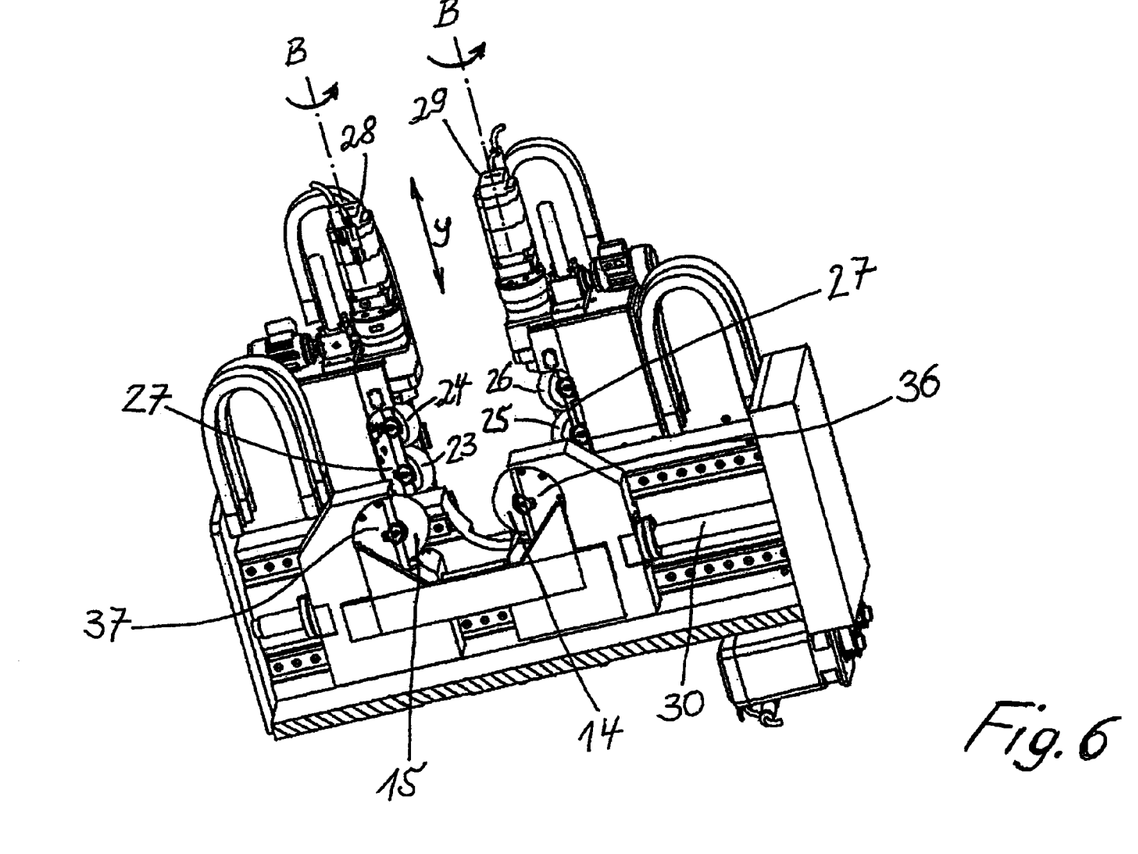

By contrast, the work roller 15 rotatably mounted in housing 37 in slide 10 is provided with a counter-roller 14 for the purpose of machining the axle zones 3 and 4 on wheelset shaft 5. The work rollers 14, 15, 23 to 26 are not driven but are set in rotation by the driven wheelset shaft 5. The drive units 28 and 29 are used to pivot the work rollers 23 and 24 or 25 and 26 around the B-axes. Two further drive units are used to move the work rollers 23, 24 or 25, 26 vertically in the y-direction, FIG. 6. The work rollers 23 and 25 form the first pair, the work rollers 24 and 26 the second and the work rollers 14 and 15 a third pair of work rollers.

A spindle drive 30, which is specifically shown in FIG. 7 once again, is provided for the infeed of the two drive units 28 and 29 in the x-direction towards the wheelset shaft 5. The spindle drive 30 is initiated by drive motor 31 originating via belt drives 32 and 33. All work rollers 14, 15 and 23 to 26 are fed in simultaneously in the x-direction. In addition, the spindle drive 30 moves the two carriers 34 and 35 with housings 27, 36 and 37—where the work rollers 23 to 26 or 14 and 15 are each rotatably mounted—in the x-direction towards wheelset shaft 5 or away from there again once deep rolling has finished. With respect to the spindle drive 30, the two carriers 34 and 35 are still each supported via the spring assemblies 38 and 39. The spring assemblies 38 and 39 enable the work rollers 14, 15 and 23 to 26 to be in a position to follow irregularities in the roundness and in the shape of the wheelset shaft 5 on a limited basis. Ideally, spindle drive 30 is in the x-direction, which means it can move in this direction by up to 5 mm within the respective slide 8 to 10. This makes is possible to compensate for any differences in the diameters of the work rollers 14, 15 and 23 to 26 without having to exert additional forces on the system.

Figure 7:
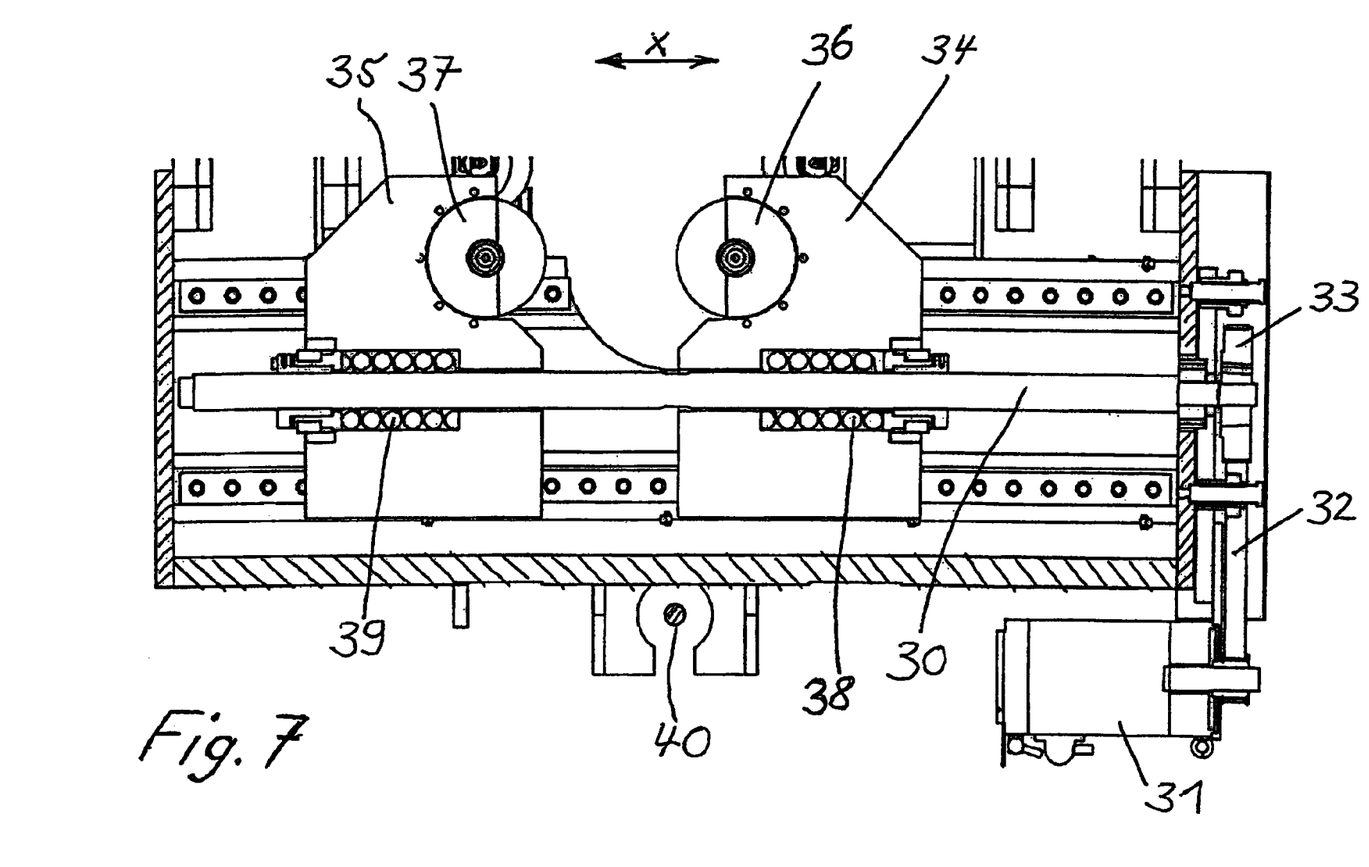
Figures 8, 9:
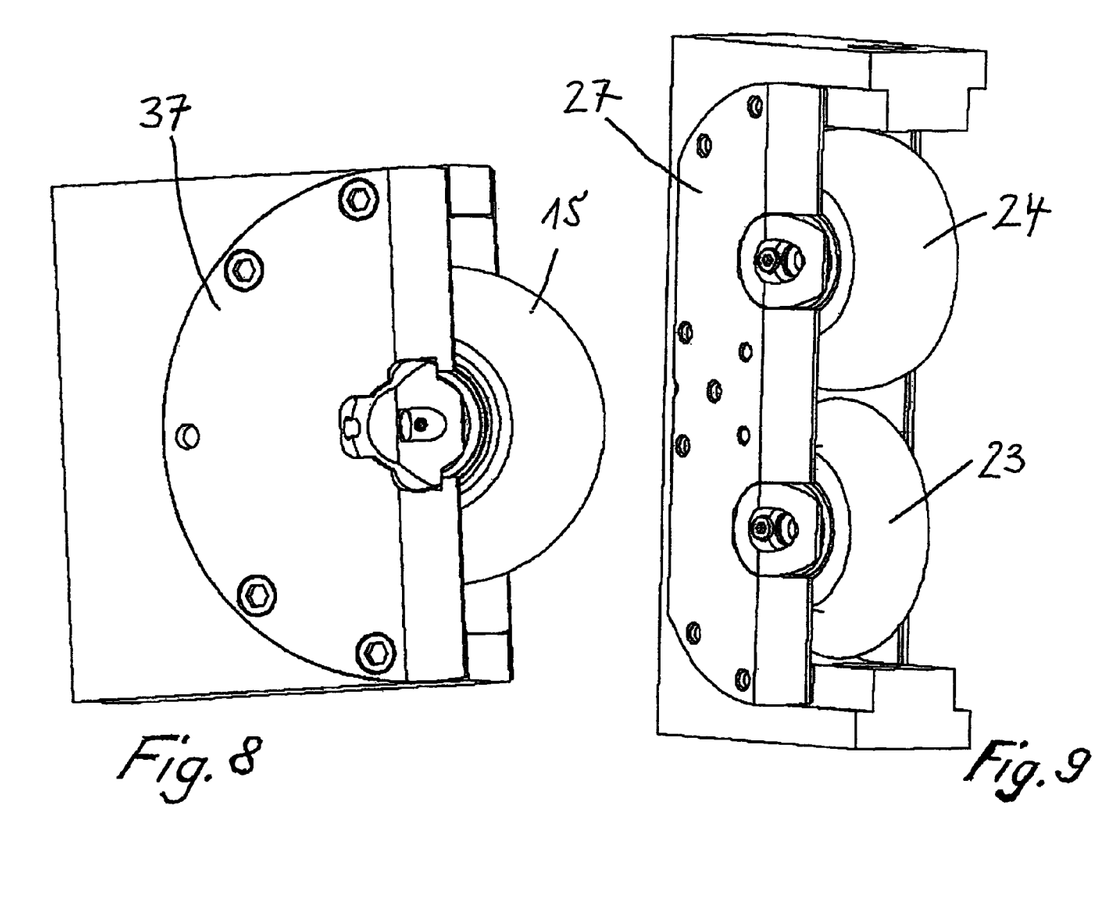
Figure 10:
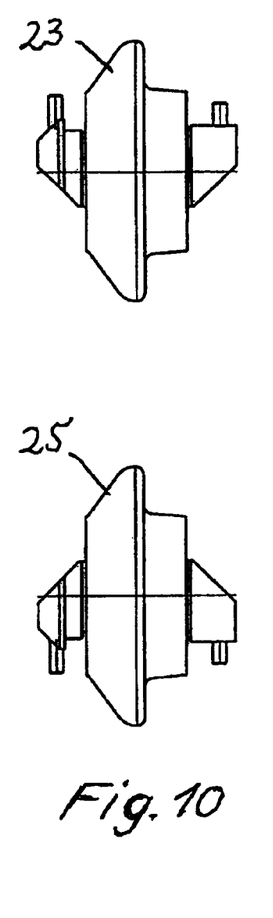
Figure 11:
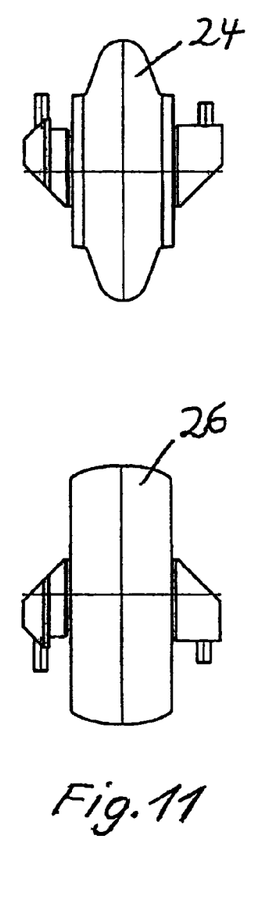

In the machine's z-direction, the work rollers 14, 15, 23 to 26 for the two slides 8 and 10 each have a fixed distance 43 away from each other. This means that housing 27 and the carriers 34 and 35 each have specifically fixed lateral distances away from each other. As a consequence, spindle drive 30, which is shown in FIG. 7 for the movement of work rollers 14 and 15, is also effective in the same way for the work rollers 23 and 24 or for their counter-rollers 25 and 26. A central spindle 40, which stretches over the longitudinal centre of the machine bed 11 and is set in rotation by a drive (not shown), is provided for the feed movement of the two slides 8 and 10 in the machine's z-direction.

At the start of the deep rolling operation, the work rollers 23 and 25 roll the axle zones 1 and 2, whereby they are each pivoted around the B-axis for machining the corner groove 7 and the transition 41. At the same time, the work rollers 14 and 15 roll the start 42 of axle zone 4. After the axle zones 1 and 2 have been deep rolled, the work rollers 23 and 25 are disengaged by shifting in the vertical direction (y-direction) and the work rollers 24 and 26 become meshed. The work rollers 24 and 26 then roll the axle zone 3, where the press seating is located between the wheelset shaft 5 and the wheel disc. At the same time, the work rollers 14 and 15 continue to machine axle zone 4 in the direction towards the longitudinal centre 6 of wheelset shaft 5.

The invention claimed is:

1. A machine tool for deep rolling a plurality of individual lengthwise sections of a wheelset shaft of a rail vehicle wheelset, the machine tool comprising:

first and second deep rolling tool sets for machining the wheelset shaft, each tool set moveable in the x, y and z directions of the machine tool;

wherein the first and second deep rolling tools are arranged at opposite lengthwise ends of the wheelset shaft and are operable to work towards each other in the axial z direction of the machine tool towards a longitudinal centerline of the wheelset shaft;

wherein each of the first and second deep rolling tool sets comprises three pairs of work rollers;

wherein each pair of work rollers is configured for deep rolling at least one of the lengthwise sections of the wheelset shaft;

wherein a first pair of work rollers is configured for deep rolling first and second lengthwise sections of the wheelset shaft;

wherein a second pair of work rollers is configured for deep rolling a third lengthwise section of the wheelset shaft; and wherein a third pair of work rollers is configured for deep rolling a fourth lengthwise section of the wheelset shaft extending between the third lengthwise section and at least the longitudinal centerline of the wheelset shaft; and wherein one work roller of the first pair of work rollers and one work roller of the second pair of work rollers are arranged together in a first housing with the work roller of the second pair of work rollers arranged vertically above the work roller of the first pair of work rollers in the y direction and one work roller of the third pair of work rollers is arranged in a second housing.

2. The machine tool according to claim 1, wherein the first and second pairs of work rollers of at least one of the first and second deep rolling tool sets are positioned at an axial distance away from the third pair of work rollers of the at least one of the first and second deep rolling tool sets in the z-direction of the machine tool.

3. The machine tool according to claim 2 further comprising a slide upon which the first, second and third pairs of work rollers of the at least one of the first and second deep rolling tool sets are arranged.

4. The machine tool according to claim 3, wherein the slide is movable in the z-direction of the machine tool.

5. The machine tool according to claim 1 wherein the first deep rolling tool set is disposed on a first slide movable in the z-direction of the machine tool; and wherein the second deep rolling tool set is disposed on a second slide movable in the z-direction of the machine tool.

6. The machine tool according to claim 5, wherein the first and second pairs of work rollers of at least one of the first and second deep rolling tool sets are positioned at an axial distance away from the third pair of work rollers of the at least one of the first and second deep rolling tool sets in the z-direction of the machine tool.

* * * * *